Dec. 25, 1956 J. A. GROSJEAN 2,775,646

SINGLE-SIDEBAND APPARATUS

Filed Nov. 23, 1951 2 Sheets-Sheet 1

INVENTOR
JOHAN ADRIAAN GROSJEAN

SINGLE-SIDEBAND APPARATUS

Filed Nov. 23, 1951 2 Sheets-Sheet 2

INVENTOR
JOHAN ADRIAAN GROSJEAN 2,775,646
Patented Dec. 25, 1956

1

2,775,646

SINGLE-SIDEBAND APPARATUS

Johan Adriaan Grosjean, Hilversum, Netherlands, assignor to Hartford National Bank and Trust Company, Hartford, Conn., as trustee Application November 23, 1951, Serial No. 257,680

Claims priority, application Netherlands November 30, 1950

6 Claims. (Cl. 179—15)

Figure 1:
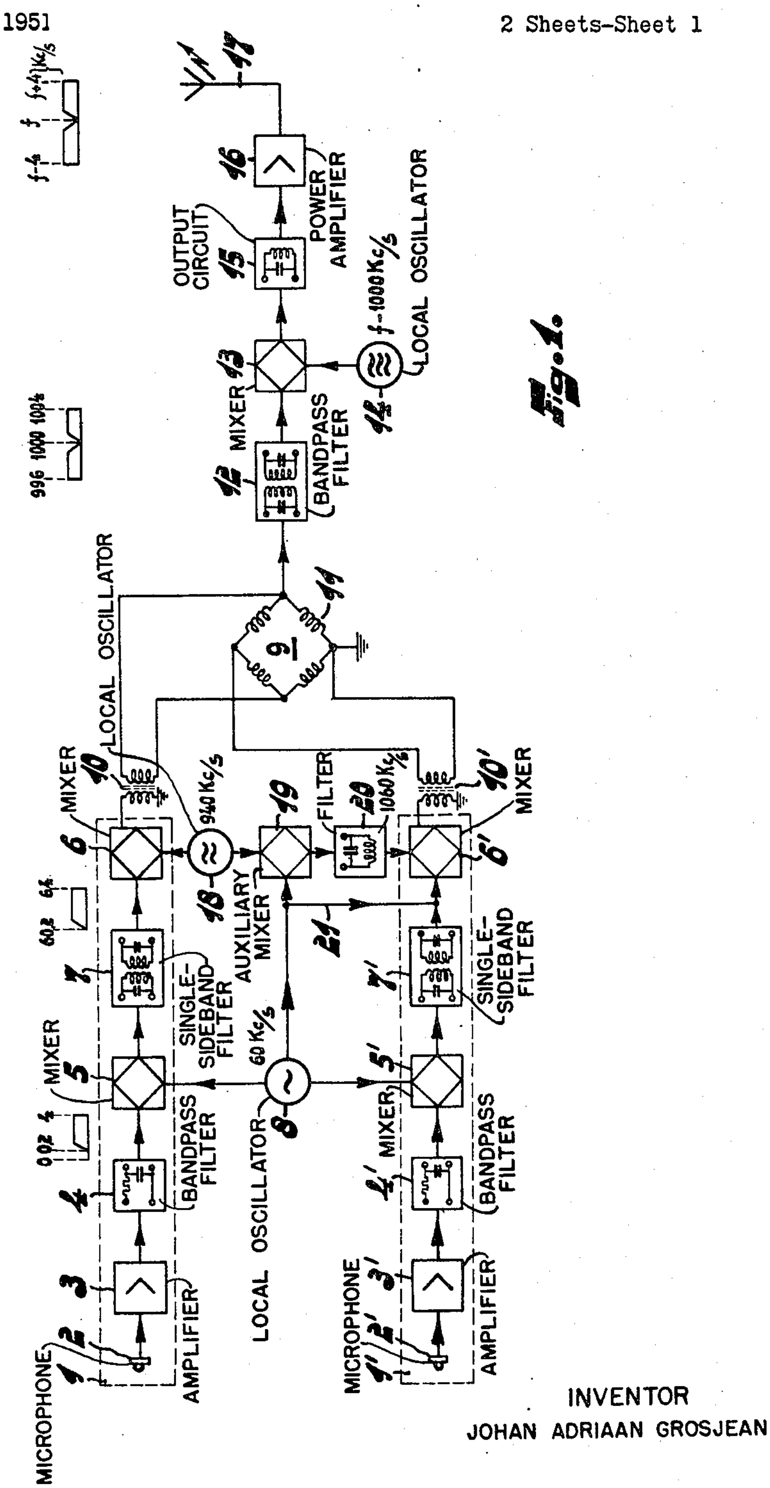

The invention relates to single-sideband apparatus for transmitting or receiving purposes for simultaneous transmission of two signals, for example, telex, music, stereophonic signals and the like, by way of upper and lower sidebands of a common carrier-wave frequency.

In a known single-sideband apparatus, each of the individual channels comprises two successive mixing stages for frequency transposition and one intermediate single-sideband filter.

At the transmitter side, the single-sideband filters connected between the mixers serve to select the wanted upper- and lower sideband of the individual low-frequency signals modulated on a common carrier-wave frequency, whereas, at the receiver side, these single-sideband filters separate the upper and the lower sideband of the common carrier-wave frequency from one another in the individual channels.

The invention has for its object to provide an improved single-sideband apparatus.

According to the invention, a single-sideband apparatus for the simultaneous transmission of two signals in the form of the lower sideband and the upper sideband of a common carrier-wave, the individual signal channels comprising two successive mixers for frequency-transposition and an intermediate single-sideband filter, is characterized in that the inputs of the mixers connected to the low-frequency parts of the individual channels are connected to a first local oscillator common to the two channels, whilst the further mixers have supplied to them local oscillations, of which the frequencies have a difference equal to double the frequency of the first local oscillator and which are produced by means of a second local oscillator and an auxiliary mixer the inputs of which are coupled with the two local oscillators, whilst identical single-sideband filters are connected between the mixers in the individual channels.

A particular advantage of the apparatus resides in the identity of the individual channels, which is of material importance with a view to manufacture. Furthermore, in order to replace any individual channel in the event of a breakdown only a single channel drawer need be kept in stock.

The output of the second local oscillator may be coupled directly with the mixer in one individual channel and through the auxiliary mixer and a selective circuit to the mixer in the other individual channel, the tuning frequency of the selective circuit being equal to the combined frequency of the frequency produced by the second local oscillator and twice the frequency produced by the first local oscillator.

As an alternative the output of the auxiliary mixer may be connected to the mixers in the individual channels via selective circuits tuned to the sum or the difference of the two local oscillator frequencies.

In order that the invention may be more clearly understood and readily carried into effect, it will now be described more fully with reference to the accompanying diagrammatic drawing, given by way of example, in which:

2

Figure 2:
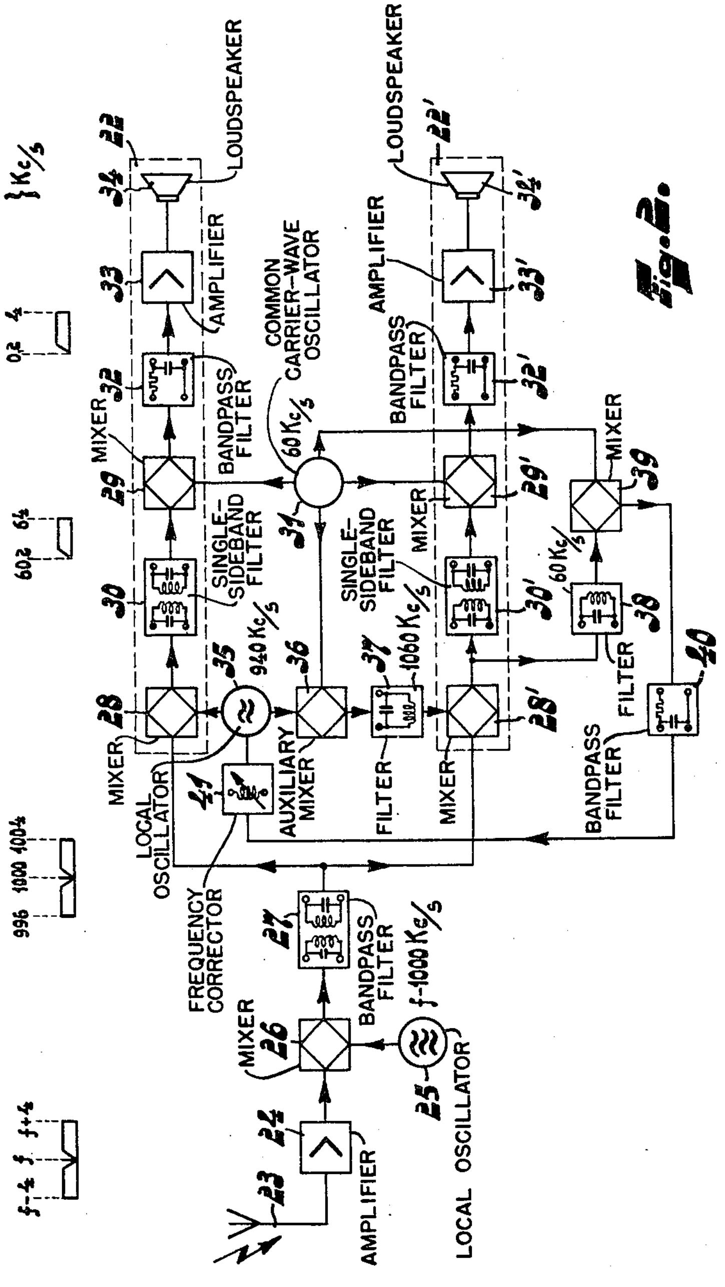

Fig. 1 is a block diagram of a single-sideband transmitter according to the invention and Fig. 2 is a block diagram of a single-sideband receiver according to the invention.

Fig. 1 shows a single-sideband transmitter according to the invention, of which the two individual channels are designated 1 and 1'. Each of the individual channels 1 and 1' comprise a microphone 2 and 2', respectively, which is connected through a low-frequency amplifier 3 and 3', respectively, to a low bandpass filter 4 and 4', respectively. The outputs of the filters 4 and 4' exhibit low-frequency signals which cover for example a frequency range of from 0.2 to 4 kc./s.

The individual channels 1 and 1' furthermore comprise two successive mixers 5, 6 and 5', 6' respectively, producing frequency transposition, identical single-sideband filters 7 and 7' being connected between the mixers 5, 6 and 5', 6', respectively, of the individual channels. The inputs of the mixers coupled with the low bandpass filters 4 and 4' are connected to a local oscillator 8, which is common to the two channels and which is tuned to 60 kc./s. The identical single-sideband filters 7 and 7' allow one of the sidebands, for example, the upper sideband (60.2 to 64 kc./s.) of the sidebands occurring across the outputs of the mixers 5 and 5' and covering the frequency ranges of from 56 to 59.8 kc./s. and 60.2 to 64 kc./s., respectively, to pass.

These single-sideband signals are converted in the mixers 6 and 6' into the lower and upper sideband of a common carrier-wave frequency of, for example, 1000 kc./s. Consequently, in the numerical example given in this embodiment, the lower sideband covers the frequency range of from 996 to 999.8 kc./s. and the upper sideband the frequency range of from 1,000.2 to 1,004 kc./s.

In a bridge circuit 9, of which the two diagonal branches are coupled with the outputs of mixers 6 and 6' by way of transformers 10 and 10', respectively, these signals are joined. The impedances of the transverse branches, which are formed by coils in the embodiments shown, are preferably identical with one another. The use of identical bridge impedances has the advantages that the mixers are prevented from affecting one another and the ratio between the strengths of the output signals of the mixers 6 and 6', subsequent to joining, remains constant. The bridge impedances may be formed not only by coils but also by capacitors, resistors or combinations thereof.

The combined single-sideband signals taken from the bridge branch 11 are supplied through a bandpass filter 12 (passing a band from 996 to 1004 kc./s.) to a mixer 13 connected to a local oscillator 14. In the mixer 13 these single-sideband signals are impressed on a carrier-wave frequency of $f$—1,000 kc./s. and fed to a transmitting aerial 17 by way of an output circuit 15 and a power amplifier 16.

The signals emanating from the transmitter microphones 2 and 2' and emitted through the aerial 17 cover the frequency ranges from ($f$—0.2) to ($f$—4) kc./s. and from ($f$+0.2) to ($f$+4) kc./s. respectively.

In the mixers 6 and 6', the low-frequency signals transferred to the frequency range of from 60.2 to 64 kc./s. are converted into the lower and upper sideband of a carrier-wave frequency of 1000 kc./s. This is achieved by supplying local oscillations, of which the frequencies exhibit a difference equal to twice the frequency of the first local oscillator ($2\times60=120$ kc./s.) to the mixers 6 and 6'. In the numerical example given in this embodiment, the frequencies of the local oscillations supplied to the mixers 6 and 6' are 940 and 1060 kc./s. respectively. By this mixing, sideband signals having frequency bands from 876 to 879.8 kc./s. and from 1,000.2 to 1,004 kc./s. respectively, occur across the output of the mixer 6, whereas for the mixer 6' these frequency bands are from 996 to 999.8 kc./s. and from 1,120 to 1,124 kc./s. The unwanted sidebands 876 to 879.8 kc./s. and 1,120.2 to 1,124 kc./s. are suppressed in the bandpass filter 12.

For producing the local oscillations for the mixers 6 and 6', these oscillations having a frequency difference of 120 kc./s., the transmitter comprises a second local oscillator 18 and an auxiliary mixer 19, of which the inputs are connected to the local oscillators 8 and 18. In the circuit-arrangement shown, the oscillator 18 produces an oscillation of 940 kc./s., which is fed as a local oscillation in direct manner to the mixer 6. The local oscillation (1,060 kc./s.) for the mixer 6' is obtained by mixing the oscillation of the oscillator 18 (940 kc./s.) and the second harmonic of the oscillator 8 oscillating at 60 kc./s., the combination oscillation thus obtained being supplied to the mixer 6' through a circuit 20 tuned to the desired local oscillation. The second harmonic of the oscillation of 60 kc./s. required for producing the said local oscillation is produced by distortion of this oscillation, for example, by suitable adjustment of the auxiliary mixer 19.

In order to reproduce accurately common carrier-wave frequency of the single-sideband signals emitted through the aerial 17 at the receiver side, a pilot oscillation is emitted at the same time in the transmitter described, the frequency of this oscillation corresponding with the said carrier-wave frequency. For this purpose the output of the oscillator 8 is connected through conductor 21 to the input of the mixer 6'. As will be obvious from the foregoing, this oscillation yields subsequent to frequency transposition in the mixer 6' and the mixer 13, the desired pilot oscillation of *f* kc./s.

Fig. 2 shows a single-sideband receiver according to the invention, in which the individual channels are designated 22 and 22'. The receiving apparatus is arranged for the reception of signals emitted by the transmitter shown in Fig. 1, in which consequently the lower and upper sidebands are between ($f-4$) and ($f-0.2$) kc./s. and between ($f+0.2$) and ($f+4$) kc./s., respectively.

The signal received through a receiving aerial 23 is supplied, subsequent to high-frequency amplification in amplifier 24, to a mixer 26 connected to a local oscillator 25 having a frequency of $f-1{,}000$ kc./s. The frequency-transferred single-sideband signals occurring across the output of the mixer in the frequency bands from 996 to 998.8 kc./s. and from 1,000.2 to 1,004 kc./s., are supplied through a bandpass filter 27 in parallel connection to the individual signal channels 20 and 20'.

Each of the individual signal channels 20 and 22' comprises the cascade arrangement of two mixers 28 and 29, and 28' and 29', respectively, the inputs of the mixers 28 and 28' being connected to the bandpass filter 27. The frequencies of the local oscillations for the mixers 28 and 28' are chosen to be such that the carrier-wave frequencies of the output oscillations for the two channels are equal and are, for example, 60 kc./s. The individual signals, which correspond to the lower and upper sidebands of the incoming signals, are selected by means of identical single-sideband filters 30 and 30' connected between the mixers 28 and 29, and 28' and 29', respectively, and are supplied to the mixers 29 and 29' connected to a common carrier-wave oscillator 31 (60 kc./s.). The low-frequency signals occurring across the outputs of the mixers 29 and 29' (0.2 to 4 kc./s.) are supplied through low bandpass filters 32 and 32' and low-frequency amplifiers 33 and 33' to individual reproducing devices 34 and 34'.

In the mixers 28 and 28' the single-sideband signals supplied thereto (996 to 999.8 kc./s. and 1,000.2 to 1,004 kc./s.) are shifted to the same carrier-wave frequency of 60 kc./s. This is carried out by supplying local oscillations to the said mixers, the frequencies of these oscillations having a difference equal to double the frequency of the local carrier-wave oscillator 31 ($2\times60$ kc./s.$=120$ kc./s.). In the embodiment shown, the local oscillations for the mixers 28 and 28' are 940 and 1,060 kc./s. respectively. The lower sideband (996 to 999.8 kc./s.) and the upper sideband (1,000.2 to 1,004 kc./s.) are shifted in the mixer 28 to the frequency bands from 56 to 59.8 kc./s. and from 60.2 to 64 kc./s. respectively, whereas in the mixer 28' this order is reversed and with the lower sideband (996 to 999.8 kc./s.) corresponds the single-sideband signal in the frequency band from 60.2 to 64 kc./s. and with the upper sideband, from 1,000.2 to 1,004 kc./s., corresponds the single-sideband signal in the frequency range of from 56 to 59.8 kc./s. The selection of the individual single-sideband signals may, consequently, be carried out by identical single-sideband filters 30 and 30', which, for example, allow a frequency band of from 60.2 to 64 kc./s. to pass.

The local oscillations for the mixers 28 and 28' are obtained with the aid of a local oscillator 35 having a frequency of 940 kc./s. and of an auxiliary mixer 36, the inputs of which are connected to the local oscillators 31 and 25. The output of the oscillator 35 is connected to the mixer 28, whereas the output of the auxiliary mixer 36 is connected through a selective circuit 37 tuned to the desired frequency (1,060 kc./s.) to the mixer 28'. The operation corresponds exactly with that of the circuit-arrangement in the transmitting apparatus.

For faithful reproduction of the incoming signals, the carrier-wave locally produced by the oscillator 31 must accurately correspond with the carrier-wave of the incoming single-sideband signals.

This is carried out by filtering out the incoming pilot oscillation (*f* kc./s.) which corresponds with the carrier-wave of the single-sideband signals, subsequent to frequency shift in the mixers 26 and 28', by means of a selective circuit 38 and by comparing it in a mixer 39, which operates as a phase detector, with an oscillation originating from the local carrier-wave oscillator 31. Subsequent to filtering, the frequency of the pilot oscillation is 60 kc./s. In the event of frequency difference between the two oscillations, the output of the mixer 39 exhibits an alternating voltage of difference frequency and in the event of synchronism, a direct voltage, of which the value and polarity vary with the phase difference. For frequency correction this control-voltage is supplied through a low bandpass filter 40 to a frequency corrector 41, for example, a reactance tube coupled with the oscillator 35. The oscillator 35 is thus controlled in a manner such that the carrier wave locally produced by the oscillator 31 corresponds accurately in frequency with the carrier wave of the incoming single-sideband signals.

It should be noted that other methods for reproducing the carrier-wave oscillation at the receiver side may be used. For example, as has been suggested two pilot oscillations may be emitted, the frequency interval between the carrier-wave and the neighboring pilot oscillation being chosen to be equal to the frequency interval between the pilot oscillations. The carrier-wave is produced at the receiver side by selecting the pilot oscillations and mixing them in a mixer, the required local carrier-wave then occurring across the output of the mixer.

In the single-sideband apparatus described with reference to Figs. 1 and 2, the local oscillations for the mixers 6 and 28 are taken directly from the outputs of the local oscillators 18 and 35, respectively, whereas the local oscillations for the mixers 6' and 28' are obtained by mixing the oscillations of the oscillators 18 and 35 with the second harmonics of the oscillations of the oscillators 8 and 31 in the auxiliary mixers 19 and 36, respectively.

The local oscillations for the mixers 6 and 28, and 6' and 28', which exhibit a difference equal to double the frequency of the first local oscillator 8 and 31, respectively, may, as an alternative, be taken from the outputs of the auxiliary mixers 19 and 36 respectively. For this purpose the outputs of the auxiliary mixers 19 and 36 are connected through selective circuits tuned to the sum frequency and the difference frequency of the two local oscillator frequencies to the mixers 6 and 28, and 6' and 28', respectively. If it is assumed in this case that the frequencies of the oscillators 8 and 31 are 60 kc./s. and those of the oscillators 18 and 35 are 1,000 kc./s., the frequencies of the local oscillations of the mixers 6 and 28, and 6' and 28', respectively, are equal to 940 and 1,060 kc./s. The frequencies of these local oscillations thus entirely correspond with this choice of the frequencies of the oscillations of the local oscillators, with those of the local oscillations for the mixers 6, 28 and 6' and 28', respectively, of the single-sideband apparatus shown in Figs. 1 and 2.

What I claim is:

1. In a communication system for the simultaneous transmission of two signals, a transmitter to emit said signal in the form of the upper and lower sidebands of a common carrier comprising two channels for the respective signals, each channel having first and second mixers in successive arrangement, a single sideband filter interposed between said first and second mixers and means to apply respective signals as an input to the first mixer, a first local oscillator connected in common to the first mixer of both channels to combine with the signals applied thereto to produce a wave in the output thereof having two sidebands only one of which is fed by the associated filter as an input to the second mixer, and means to apply respective local oscillations to the second mixers of both channels differing in frequency to an extent equal to twice the frequency of the first local oscillator, said last-named means including a second local oscillator and an auxiliary mixer to combine the frequencies of said first and second local oscillators.

2. A transmitter, as set forth in claim 1, wherein the output of said second local oscillator is applied directly to the second mixer in one channel, and means including a selective circuit to apply the output of the auxiliary mixer as the local oscillation to the second mixer of the other channel, said selective circuit being tuned to a frequency equal to the combined frequency of the fundamental frequency of the second local oscillator and twice the frequency of the first local oscillator.

3. A transmitter, as set forth in claim 1, further including first and second selective circuits coupled to said auxiliary mixer to derive local oscillations therefrom for application to the second mixers, said selective circuits being tuned respectively to the sum frequency and the difference frequency of the first and second local oscillators.

4. A transmitter, as set forth in claim 1, further including a combination bridge network having four identical bridge impedances forming two diagonal branches, means connecting the output of the second mixer of one channel to one of said branches, means connecting the output of the second mixer of the other channel to the other branch, and means to derive combined single-sideband signals from one of said impedances.

5. A transmitter, as set forth in claim 1, including means to feed the oscillations from said first local oscillator to said second mixer in one of said channels to provide pilot oscillations.

6. A communication system for the simultaneous transmission of two signals; said system comprising a transmitter to emit said signals in the form of the upper and lower sidebands of a common carrier, said transmitter comprising two channels for the respective signals, each channel having first and second mixers in successive arrangement, a single sideband filter interposed between the first and second mixers and means to apply respective signals as an input to the first mixer, a first local oscillator connected in common to the first mixers of both channels to combine with the signals applied thereto to produce a wave in the output of each first mixer having two sidebands only one of which is fed by the associated filter as an input to the second mixer in the channel, and means to apply respective local oscillations to the second mixers of the two channels, which local oscillations differ in frequency to an extent equal to twice the frequency of said first local oscillator; and a receiver for intercepting said emitted carrier having upper and lower sidebands and including a high-frequency section for said received carrier, two individual receiving channels having their inputs coupled in parallel to the output of said section, each receiving channel having a mixing stage therein, and a local carrier wave oscillator coupled in common with the mixing stages of both receiving channels whereby said stages yield the desired signals, said system further comprising means whereby said transmitter also emits said carrier as a pilot oscillation and wherein said receiver includes filter means coupled to one of said receiving channels to extract said pilot oscillation therefrom and means to compare said pilot oscillations with said local carrier wave oscillations to produce an automatic frequency control voltage for said receiver.

References Cited in the file of this patent

UNITED STATES PATENTS

| | | |
|---|---|---|
| 1,641,431 | Horton | Sept. 6, 1927 |
| 1,717,064 | Rettenmeyer | June 11, 1929 |
| 2,261,628 | Lovell | Nov. 4, 1941 |
| 2,262,764 | Hull | Nov. 18, 1941 |
| 2,270,385 | Skillman | Jan. 20, 1942 |

FOREIGN PATENTS

| | | |
|---|---|---|
| 302,901 | Great Britain | May 23, 1929 |